Patented Feb. 15, 1949

2,461,911

UNITED STATES PATENT OFFICE 2,461,911

PROCESS FOR THE DEGRADATION OF THE SIDE-CHAIN OF STEROIDS AND STEROIDS SUITABLE THEREFOR

Karl Miescher, Riehen, Hugo Frey, Olten, and Charles Meystre and Albert Wettstein, Basel, Switzerland, assignors to Ciba Pharmaceutical Products, Inc., Summit, N. J.

No Drawing. Application August 1, 1946, Serial No. 687,694

14 Claims. (Cl. 260—397.5)

This application is a continuation-in-part of our application Serial No. 657,896, filed March 28, 1946, which is a continuation-in-part of our application Serial No. 497,556, filed August 5, 1943.

In application Serial No. 497,556 and in continuation-in-part Serial No. 581,963, filed March 9, 1945 (now abandoned), we disclosed processes for the degradation of the side-chain of steroids which makes possible the removal of at least three of the carbon atoms originally contained in the side-chain. These already disclosed new processes comprise causing ring-saturated or ring-unsaturated steroids which contain in 17-position a substituent

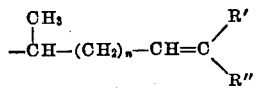

wherein R' and R" represent hydrogen, an aliphatic, aromatic or hydroaromatic radical, and $n$ means the number 1 or 2, if necessary with temporary protection of nuclear double bonds and sensitive substituents, to react with carboxylic acid imides, amides or arylamides which are substituted by halogen at the nitrogen atom, subsequently treating the products obtained with agents capable of eliminating hydrogen halide (any ammonium compounds, acyloxy derivatives or ethers intermediately produced being subjected to heat), and finally splitting up the newly formed conjugated double bond by means of oxidizing agents, if necessary with temporary protection of nuclear double bonds and sensitive substituents. In one form of the process a hydroxyl group is converted into a keto-group before the oxidative splitting of the conjugated system.

The starting materials for our already disclosed new processes can be prepared, for example, from functional derivatives such as esters, halides or anhydrides of steroid carboxylic acids, which contain in the 17-position the radical

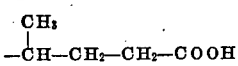

or from steroid ketones which contain the side-chain

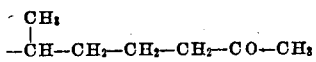

by known methods. Examples of such acids are, in particular, cholic acid, desoxycholic acid, chenodesoxycholic acid, hyodesoxycholic acid, litho-cholic acid, cholanic acid, allocholanic acid, urso- cholanic acid, $\Delta^5$-3-hydroxy-cholenic acid, $\Delta^7$-3,12-dihydroxy-cholenic acid and apocholic acid; examples of ketones are norcholestane-3-ol-25-one and $\Delta^5$-nor-cholestene-3-ol-25-one. In addition to the acids and ketones mentioned, there may be used starting materials derived from corresponding derivatives, substitution or conversion products containing any substituents, particularly keto-groups; also those derived from the next higher homologues of the acids and the next lower homologues of the ketones mentioned. Such carboxylic acid derivatives or ketones can be caused to react with organic compounds of magnesium or other metals, e. g. methyl, ethyl or phenyl magnesium halides, and water can be eliminated directly or indirectly from the tertiary carbinols obtained. In addition to the ethylene compounds produced in the manner described, compounds of the type of dehydro-nor-cholene (see, Wieland and co-workers, Zeitschrift für Physiologische Chemie, 150, page 273 [1925]; ibidem, 186, page 229 [1930]) are suitable for use as starting materials. In these compounds the group

is represented by the carbon atom 12 and the residual cyclopentanopolyhydrophenanthrene structure.

A number of methods for the degradation of the side-chain of steroids are already known. For instance, the gradual degradation of bile acids by Wieland's or Curtius' method is widely used, which methods have to be repeated several times, as only one carbon atom is removed at a time. These processes are therefore very tedious and expensive and, in addition, only give very moderate yields. The radical oxidation of sterols with chromic acid is simpler. But in this case too, only a little part of the parent compound is converted into products with a largely or completely degraded side-chain. To a considerable extent the side-chain is only insufficiently degraded e. g. down to the stage of nor-cholestane-25-one or of cholanic acid, or the nucleus is split up under the vigorous conditions of the reaction. If the partly degraded products of the reaction are again strongly oxidized, the total yield decreases quite considerably, calculated on the amount of the twice oxidized parent substance. This is all the more pronounced as compounds of the cholanic acid series give worse results on vigorous oxidation, than the sterols. Finally many steroids, substituted in the nucleus in a special way, only occur in nature in the form of the cholanic acids and not as the corresponding sterols. For these reasons, a process which allows compounds of the cholanic acid or the nor-cholestane-25-one series to be degraded to a considerable degree with a good yield and in a clear and easy manner, represents a considerable advance.

In the first stage of our already disclosed new processes, derivatives of imides of dicarboxylic acids which are substituted by halogen (e. g. bromine or chlorine) at the nitrogen atom, are caused to act on the parent materials; as examples of such derivatives may be given N-halogen succinimides, phthalimides, parabanic acids, cyanuric acids, hydantoins or barbituric acids. In their stead corresponding derivatives of primary or secondary carboxylic acid amides, such as acetamide, propionamide or diacetamide, or of carboxylic acid arylamides, e. g. acetanilides and benzanilides halogenated or nitrated in the nucleus, may also be used. To carry out halogenation of the methylene group, which is present in the substituent mentioned in the α-position to the double bond, it is best to work in an inert solvent or diluent such as carbon tetrachloride, chloroform, benzene, cyclohexane, methyl-cyclohexane, ethyl ether or dioxane.

Double bonds which may be present in the cyclopentanopolyhydrophenanthrene nucleus can be temporarily protected during halogenation in the usual way by saturation with halogen or hydrogen halide. The latter has the special advantage that the double bonds are regenerated in the next stage by means of basic reagents. Finally, substituents which are sensitive to halogenating agents may be advantageously protected temporarily, particularly free hydroxyl groups, for example, by esterification or etherification. The esters with aromatic acids such as benzoic acid are, in contrast to the free hydroxyl compounds, very stable to the above halogenating agents; the esters with aliphatic acids are also generally attacked more slowly than the active methylene groups. Free keto groups also react considerably more slowly and hardly need to be protected. If necessary they can be converted into acetals, in particular of glycols. Free carboxyl groups do not react in general and therefore generally do not need special protection.

The halogenated products are subjected, either in the crude form or after purification, to a treatment eliminating hydrogen halide, e. g. they are treated with agents capable of eliminating hydrogen halide, for instance with basic agents, such as amines like collidine, quinoline, dimethylaniline, pyridine or cyclohexylamine, with alkaline or alkaline earth hydroxides or carbonates; instead of them also carboxylic acid salts such as the alkali or silver salts of fatty acids or even alcohols or phenols may be used. According to the reagents used and the conditions of the reaction, the reactive halogen is directly eliminated in the form of hydrogen halide and/or there are formed ammonium halides by the action of tertiary amines (e. g. pyridinium halides which, owing to their insulubility in ether, are easy to separate), acyloxy derivatives by the action of carboxylic acid salts, or ethers by the action of alcohols or phenols. Ammonium halides, ammonium bases obtained from them, acyloxy derivatives and ethers are subsequently advantageously decomposed by heat, preferably in a vacuum or in an inert gas, so that an elimination of hydrogen halide is produced in stages. Instead of the agents capable of eliminating hydrogen halide, there can be used appropriate measures, such as heating, evacuating, or the said agents and measures can also be combined. Reaction products with conjugated double bonds containing acyloxy groups which have been obtained can subsequently be completely or partially saponified.

The conjugated double bond newly formed in the reaction products is then split up by direct or indirect oxidation in known manner. We mention, for example, oxidation by means of a compound of hexavalent chromium (such as chromic acid), permanganate, ozonisation and splitting of the ozonides, the action of peroxides such as perbenzoic acid, monoperphthalic acid or hydrogen peroxide (preferably in the presence of osmium tetra-oxide), and splitting (by means of, for example, chromic acid, lead tetra-acylates or periodic acid) of the glycols formed by hydrolysis of the oxide-ring or by direct addition of two hydroxyl groups to each of the double bonds.

During the oxidation, the double bonds contained in the cyclopentanopolyhydrophenanthrene nucleus may also be temporarily protected, for example, by addition and subsequent elimination of halogen or hydrogen halide, provided such protection is not made unnecessary by the special properties of the unsaturated system, such as, for example, a double bond with a keto group in the α-position. In addition, other sensitive substituents such as hydroxyl groups may be protected in known manner, e. g. by esterification or etherification and after oxidation again liberated, if desired, partly or completely by hydrolysis. If, however, conversion of the nuclear hydroxyl groups to keto groups is desired, it can be carried out in known way, before, during or after oxidative cleavage of the conjugated double bond by the action of, in particular, oxidizing or dehydrogenating agents. Also chromic acid, permanganates, etc. are suitable oxidizing agents for this purpose; as dehydrogenating agents may be used, in particular, metal alcoholates or phenolates and carbonyl compounds (method of exchanging oxidation stages), or for example powdered metal by heating in a vacuum.

The products obtained by the new simple process, ketones, carboxylic acids or aldehydes can be separated as usual and purified, for example, by recrystallization, chromatography, sublimation, reaction with keto reagents (particularly with those which give water-soluble condensation products), or by extraction with solutions of strong acids or their salts, or with basic reagents. They are themselves used for therapeutic purposes or may serve as intermediate products in the manufacture of medicaments.

In the halogenation step of the above described new processes it is sometimes necessary to use a large excess of one of the reaction components in order to obtain a moderately satisfactory result. The halogenated intermediate products split off hydrogen halide very easily, which latter reacts with the excess of halogenating agent to liberate halogen which in turn gives rise to side reactions.

The application Serial No. 657,896 is based on the unexpected observation that, contrary to earlier statements, the introduction of halogen in α-position to the double bond by the action of a carboxylic acid imide, amide or aryl-amide halogenated at the nitrogen is considerably facilitated by exposure to light. This improvement in the process leads to a series of advantages. The speed of reaction must be mentioned primarily. By virtue thereof side reactions are practically precluded, and this makes it possible for the first time to isolate the primarily formed halogenation products. A further advantage is that reactants can be used in approximately stoichiometric quantities. Finally, the favourable influence of the illumination on the yield must be especially emphasized.

In other respects the process of the application Serial No. 657,896 is carried out in the manner described in our aforesaid application Serial No. 497,556 and continuation-in-part Serial No. 581,963 with regard to the reaction components to be used as starting materials, the solvents, etc. It is only necessary to emphasize the ease with which hydrogen halide can be eliminated from the halogenation products, whose isolation in pure form now becomes possible by virtue of the new process. The elimination of hydrogen halide can be brought about by simple heating, so that after the treatment with the halogenating agent it is only necessary to continue the boiling in order to obtain the diene. The improved new process is of special advantage for the production of progesterone by starting from $\Delta^{5:23}$-3-hydroxy-24:24-diphenyl-choladiene by way of the corresponding triene. Either the hydroxy group in the triene is dehydrogenated to the keto-group and then the conjugated system is subjected to oxidative splitting, or the acylated or free triene is first oxidized to the methyl ketone stage and the resulting compound is converted in known manner into progesterone. The nuclear double bond may be protected, especially in the first step of the process, for example, by the addition of hydrogen halide or halogen. The $\Delta^{5:23}$-3-hydroxy-24:24-diphenyl-choladiene serving as starting material can be easily obtained from $\Delta^5$-3-hydroxy-cholenic acid. The latter acid is formed as a hitherto valueless by-product in the side chain degradation of cholesterol to dehydro-androsterone. By the new process the yield of progesterone, as compared with that obtained by the process of the aforesaid specifications, is increased many times.

For the exposure to light there may be used various sources of illumination which may or may not contain ultraviolet constituents, for example, the light from incandescent lamps, quartz lamps or arc lamps, or strong natural light such as the direct rays of the sun.

This invention is concerned with a process for the preparation of steroids which in 3-position have a free hydroxyl group and in 5-position a halogen atom, such as chlorine or bromine, and which carry in 17-position the acetyl group or a substituent of the formula

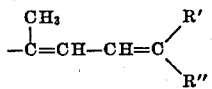

wherein R' and R" represent hydrogen atoms, aliphatic, aromatic, or hydroaromatic radicals.

This invention is further concerned with a process for the preparation of progesterone wherein corresponding compounds of the constitution mentioned are used as starting materials.

The surprising discovery was made that 3-acyloxy-steroids, which in 5-position have a halogen atom and in 17-position one of the above mentioned substituents, can be converted into 5-halogen steroids carrying a free hydroxyl group in 3-position by treatment with acid hydrolyzing agents. In the compounds so obtained the free oxy group in 3-position can be converted into a keto group and the conjugated double-linkages in the side-chain may simultaneously or subsequently be split up. From the so formed 3-keto-5-halogen compounds hydrogen halide may be eliminated while a double linkage is formed. There may be used as acid hydrolyzing agents inorganic acids such as, for instance, a hydrohalic acid or sulfuric acid, advantageously in the presence of water and an organic solvent, like ethyl alcohol, acetone, dioxane, benzene, or mixtures thereof. Concerning the remaining agents and conditions of the reaction, the process may be carried out in a manner analogous to that described above. The hereby defined process is of special advantage in making progesterone.

The following examples illustrate the whole invention but are not to be regarded as limiting it in any way, the parts mentioned being by weight:

*Example 1*

10 parts of $\Delta^{23}$-3-acetoxy-5-chloro-24:24-diphenyl-cholene melting at 178–181° C. (obtained, for example, from $\Delta^5$-3-hydroxycholenic acid methyl ester by reaction with a phenyl magnesium halide followed by partial acetylation of the resulting carbinol with acetic anhydride in the cold, splitting off the tertiary hydroxyl group by boiling in glacial acetic acid and saturating the double bond in the 5-position with hydrogen chloride) and 3.1 parts of bromosuccinimide are heated at the boil in 150 parts of carbon tetrachloride while exposed to the light from a powerful incandescent lamp. In a few minutes the reaction is finished. The solution is then cooled with ice-water, and the resulting succinimide is separated by filtering with suction.

In order to eliminate hydrogen bromide and hydrogen chloride the clear filtrate is mixed with dimethylaniline, the carbon tetrachloride is removed by distillation, and the concentrated solution is heated at the boil for a short time. The product is then taken up in ether, the dimethylaniline is removed by agitation with hydrochloric acid and water, and the ethereal solution is dried and evaporated.

For the purpose of hydrolysis the residue, which contains crude $\Delta^{5,20,23}$-3-acetoxy-24:24-diphenyl-cholatriene, is boiled in a reflux apparatus in 100 parts of ethanol with 3 parts of potassium hydroxide for 45 minutes, the solution is evaporated under reduced pressure, and the residue after dissolution in ether is washed with water. After drying and evaporating, crude $\Delta^{5,20,23}$-3-hydroxy-24:24-diphenyl-cholatriene is obtained.

To effect oxidation in the 3-position the crude triene is boiled with a solution of 90 parts of cyclohexanone in toluene, and into the slowly distilling solution is introduced dropwise a solution of 1.7 parts of aluminium isopropylate in toluene. The cooled solution is then mixed with an aqueous concentrated solution of Seignette's salt, and subjected to steam distillation. The cooled distillation residue is filtered with suction, washed with water and dried. The crude $\Delta^{4,20,23}$-3-keto-24:24-diphenyl-cholatriene so obtained is further worked up without purification.

It is taken up, for example, in a mixture of 450 parts of chloroform, 270 parts of glacial acetic acid and a little water, and slowly mixed, while stirring and cooling with ice, with a solution of about 8 parts of chromium trioxide in 20 parts of water and 270 parts of glacial acetic acid in such manner that the temperature does not rise above 3° C. The whole is stirred for a short time longer at 0° C., and unconsumed chromium trioxide is then decomposed with sodium bisulfite solution. After evaporation under reduced pressure, the whole is dissolved in water and extracted with a mixture of ether and chloroform. The ether-chloroform solutions are then washed with caustic soda solution and water, dried, and evaporated. The residue contains progesterone, and, in order to isolate the latter, the residue is dissolved, for example, in 100 parts of benzene and extracted several times with sulfuric acid of 50 per cent. strength. The sulfuric acid solutions are diluted with water, extracted with ether, and the ethereal solutions are washed neutral with caustic soda solution and water. After drying and evaporating, the crude progesterone remains behind. By recrystallization from ether or isopropyl ether there are obtained therefrom about 2.34 parts of pure progesterone having the double melting point 120° C. and 129° C. This represents a yield of 42.7 per cent. of the theoretical yield calculated on the $\Delta^{23}$-3-acetoxy-5-chloro-24:24-diphenyl-cholene which undergoes reaction.

If, on the other hand, the bromination with bromosuccinimide is conducted without the aid of light, only a small fraction of the substance enters into reaction even when a three-fold excess of bromosuccinimide is used, and the final yield, when starting material recovered is taken into account, amounts at best to 12 per cent. but is generally considerably less.

Good yields are also obtained with other sources of light, for example, a luminous arc lamp or a mercury vapour lamp, or with the use of bromophthalimide instead of bromosuccinimide.

*Example 2*

The quantity of crude $\Delta^{5,20,23}$-3-hydroxy-24:24-diphenyl-cholatriene obtained from 10 parts of $\Delta^{23}$-3-acetoxy-5-chloro-24:24-diphenyl-cholene in the manner described in Example 1 is dissolved in warm hexane, and the solution is cooled, whereupon the crystalline triene slowly separates. From hexane there are obtained crystals melting at 136–140° C., and from rectified spirit needles melting at 162–166° C. A further quantity of the triene can be isolated, for example, by chromatographing the mother liquors dissolved in hexane over aluminum oxide. A total of 5.7 parts of pure crystals are obtained, representing a yield of 66.4 per cent. of the theoretical yield.

2 parts of the triene are oxidized by means of 20 parts of cyclohexanone in toluene as described in Example 1. The resulting keto-compound is recrystallized from ethanol, and is thus obtained in a voluminous condition. It is dried under reduced pressure at 60–80° C. The pure $\Delta^{4,20,23}$-3-keto-24:24-diphenyl-cholatriene melts at 106–110° C. The yield of the pure ketone amounts to about 1.8 parts.

*Example 3*

10 parts of $\Delta^{23}$-3-acetoxy-5-chloro-24:24-diphenyl-cholene are converted into $\Delta^{5,20,23}$-3-acetoxy-24:24-diphenyl-cholatriene as described in Example 1. The crude product is suspended in hexane, filtered with suction, and then recrystallized from isopropanol. The pure compound melts at 175° C.

1 part of the acetate so obtained is oxidized in chloroform with 0.8 part of chromium trioxide as described in Example 1. The crude oil so obtained is boiled for 30 minutes in ethanol with 0.2 part of potassium hydroxide in a reflux apparatus. The alcohol is then evaporated under reduced pressure, the residue is taken up in ether, washed with water, dried, and the ethereal solution is evaporated. The residue contains crude $\Delta^{5}$-pregnene-3-ol-20-one, which can be obtained in a pure form melting at 192° C. in a yield of 0.3 part by known methods, such as chromatography or recrystallization from dilute alcohol or isopropyl ether. The pregnenolone can be converted in the usual manner into progesterone.

*Example 4*

20 parts of $\Delta^{23}$-3-acetoxy-5-chloro-24:24-diphenyl-cholene in 450 parts of carbon tetrachloride are heated at the boil for 10–15 minutes with 6.2 parts of bromosuccinimide with exposure to light. After cooling, the succinimide is separated by filtering with suction, the clear filtrate is mixed with 20 parts of glacial acetic acid, boiled for 4 hours, and then concentrated by evaporation under reduced pressure. The resinous residue is recrystallized from isopropyl ether, whereby 13.6 parts of pure $\Delta^{20,23}$-3-acetoxy-5-chloro-24:24-diphenyl-choladiene melting at 196–199° C. are obtained. From the evaporated mother liquors 2.8 parts of unchanged starting material can be recovered as well as a fraction, which does not crystallize, and which, after treatment with dimethyl-aniline and hydrolysis as described in Example 1, can be worked up into progesterone.

6 parts of the acetoxy-chloro-diene melting at 196–199° C. are oxidized in 75 parts of chloroform and 60 parts of glacial acetic acid with 4.5 parts of chromium trioxide in 3 parts of water and 27 parts of glacial acetic acid at 0° C., while stirring for 2–3 hours, to form 3-acetoxy-5-chloro-pregnane-20-one, which latter may be converted into pregnenolone acetate by treatment with dimethylaniline at 200° C., or directly into pregnenolone by means of strong alkali.

By causing dimethylaniline to act at 200° C. on $\Delta^{20,23}$ - 3 - acetoxy-5-chloro-24:24-diphenyl-choladiene there is obtained $\Delta^{5,20,23}$-3-acetoxy-24:24-diphenyl-cholatriene, which can be further worked up by, among other methods, the method described in Example 3.

*Example 5*

10 parts of $\Delta^{23}$-3-acetoxy-5-chloro-24:24-diphenyl-cholene and 3.94 parts of bromo-phthalimide are heated at the boil in 150 parts of carbon tetrachloride while exposed to the illumination of a powerful incandescent bulb. In a short time the evolution of hydrogen bromide sets in. The solution is cooled, the phthalimide so obtained is separated by filtering with suction, and the filtrate is heated for a further 4 hours in a reflux apparatus in order to complete the elimination of hydrogen bromide. After evaporation and drying under reduced pressure, the resulting $\Delta^{20,23}$-3-acetoxy-5-chloro-24:24-diphenyl-choladiene is worked up in a manner similar to that described in Example 4.

*Example 6*

10 parts of $\Delta^{23,23}$-3-acetoxy-5-chloro-24,24-diphenyl-choladiene, obtained as indicated in Example 4, are dissolved in a mixture of 100 parts of benzene, 200 parts of methanol and 5 parts of concentrated hydrochloric acid. The solution is then heated to boiling for 45 minutes, and after being diluted with water, is concentrated by evaporation under reduced pressure and an extract is obtained by agitation with ether. The ethereal extract is washed with dilute caustic soda solution and water, dried and evaporated. 8.9 parts of crude $\Delta^{20,23}$-3-hydroxy - 5 - chloro-24,24-diphenyl-choladiene remain behind which after recrystallization from hexane form crystals melting at 110–111° C.

The resultant 8.9 parts of the crude 3-hydroxy-derivative are allowed to stand for 3 hours in 150 parts of pure chloroform and 300 parts of acetic acid of 80 per cent. strength with 5 parts of chromium trioxide at 20° C. Then, after the excess of chromium trioxide has been decomposed with a solution of sodium bisulfite, the solution is concentrated in vacuum while water is added several times, which operation is followed by extraction with chloroform. When the chloroform solution is washed with water and then evaporated, 8.8 parts of crude 5-chloro - pregnane-3,20-dione remain behind. The latter substance can be washed with ether and recrystallized from ehtanol whereby needles decomposing at 162–165° C. are obtained.

After 100 parts of methanol and 10 parts of water have been poured over the crude diketone, it is mixed with 5 parts of potassium carbonate and the mixture is heated to boiling for one hour. The solution is then concentrated under reduced pressure, the remaining aqueous suspension is extracted with benzene and the benzene solution is washed with water. The benzene solution which contains the crude progesterone is repeatedly shaken with sulfuric acid of 50 per cent. strength. The sulfuric acid extracts are diluted with water, extracted with ether and the ethereal solutions are washed with caustic soda solution and water. After drying and evaporation there remains the progesterone. By recrystallizing from ether, isopropyl ether or dilute methanol, 3.1 parts of pure progesterone are obtained which substance has a double melting point of 120° C. and 129° C., such yield amounting to 56.5 per cent. of the calculated yield.

Instead of $\Delta^{20,23}$-3 - acetoxy-5-chloro-24,24-diphenyl-choladiene there may be used as starting material $\Delta^{20,23}$-3-acetoxy-5-chloro-24,24-dimethyl-choladiene which can be produced in analogous manner.

*Example 7*

10 parts of 3-acetoxy-5-chloro-pregnane-20-one, obtained as shown in Example 4, are suspended in 300 parts of methanol, mixed with 3 parts of concentrated hydrochloric acid and heated to boiling for 45 minutes, complete dissolution occurring within a short time. The cooled solution is diluted with water and freed from methanol under reduced pressure, the resultant aqueous suspension is extracted with ether, the ethereal extract is washed with water, dried and evaporated. The residue crystallizes upon the addition of isopropyl ether and is recrystallized from ethyl acetate. The thus obtained 3-hydroxy-5-chloro-pregnane-20-one forms colorless prisms, which melt unsharply at approximately 160–174° C. with decomposition.

3.5 parts of the crystallized 3-hydroxy-5-chloropregnane-20-one are dissolved in 70 parts of acetic acid of 90 per cent. strength, mixed at a temperature of 20° C. with a solution of 0.8 part of chromium trioxide in 70 parts of acetic acid of 90 per cent. strength, and allowed to stand for 3 hours at the indicated temperature.

Further processing of the oxidation products is done in accordance with Example 6 and results in 5-chloro-pregnane-3,20-dione which may then be converted into progesterone, following the directions also found in Example 6.

What we claim is:

1. The 10,13 - dimethyl - cyclopentanopolyhydrophenanthrenes carrying in 17 position a substituent of the formula

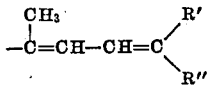

wherein R' and R'' each stands for a member of the group consisting of hydrogen, lower alkyl and lower aryl radicals, and containing in 3 position a free hydroxyl group and in 5 position a halogen atom.

2. The 10,13-dimethyl-cyclopentanopolyhydrophenanthrenes carrying in 17 position a substituent of the formula

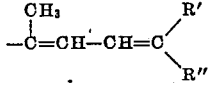

wherein R' and R'' each stands for a member of the group consisting of hydrogen, lower alkyl and lower aryl radicals, and containing in 3 position a free hydroxyl group and in 5 position a chlorine atom.

3. $\Delta^{20,23}$ - 3 - hydroxy-5-chloro-24:24-diphenyl-choladiene.

4. In a process for the degradation of the side chain of a steroid, the step which comprises treating a 3-acyl-oxysteroid containing in 5 position a halogen atom and in 17 position a member of the group consisting of the acetyl group and a substituent of the formula

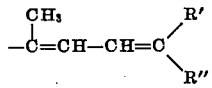

wherein R' and R'' each stands for a member of the group consisting of hydrogen, lower alkyl and lower aryl radicals, with an acid hydrolysing agent.

5. A process for the degradation of the side chain of a steroid, which comprises treating a 3-acyloxysteroid containing in 5 position a halogen atom and 17 position a substituent of the formula

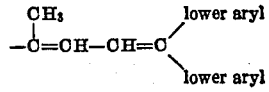

with an acid hydrolysing and then with an oxidizing agent.

6. A process for the degradation of the side chain of a steroid, which comprises treating a 3-acyloxysteroid containing in 5 position a halogen atom and in 17 position a substituent of the formula

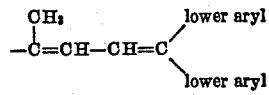

with an acid hydrolysing agent and then with chromium oxide.

7. A process for the degradation of the side chain of a steroid, which comprises treating a 3-acyloxysteriod containing in 5 position a halogen atom and in 17 position a substituent of the formula

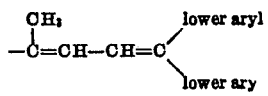

with an acid hydrolysing agent, then with chromium oxide and finally with a dehydrohalogenating agent.

8. In a process for the degradation of the side chain of a steroid, the step which comprises treating a 3-acyloxysteroid containing in 5 position a chlorine atom and in 17 position a member of the group consisting of the acetyl group and a substituent of the formula

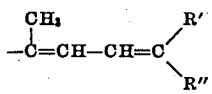

wherein R' and R'' each stands for a member of the group consisting of hydrogen, lower alkyl and lower aryl radicals, with an acid hydrolysing agent.

9. A process for the degradation of the side chain of a steroid, which comprises treating a 3-acyloxysteroid containing in 5 position a chlorine atom and in 17 position a substituent of the formula

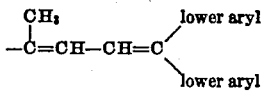

with an acid hydrolysing and then with an oxidizing agent.

10. A process for the degradation of the side chain of a steroid, which comprises treating a 3-acyloxysteroid containing in 5 position a chlorine atom and in 17 position a substituent of the formula

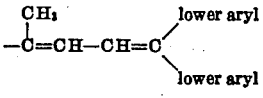

with an acid hydrolysing agent and then with chromium oxide.

11. A process for the degradation of the side chain of a steroid, which comprises treating a 3-acyloxysteroid containing in 5 position a chlorine atom and in 17 position a substituent of the formula

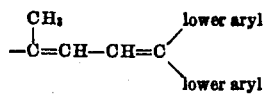

with an acid hydrolysing agent, then with chromium oxide and finally with a dehydrohalogenating agent.

12. A process for the degradation of the side chain of a steroid, which comprises treating $\Delta^{20,23}$-3-acetoxy-5-chloro-24:24-diphenyl-choladiene with an acid hydrolysing agent, then with chromium oxide, and finally with a dehydrohalogenating agent.

13. In a process for the degradation of the side chain of a steroid, the steps which comprises treating a 3-acyloxy-5-halogen-pregnane-20-one with an acid hydrolysing agent, then with an oxidizing agent and finally with a dehydrohalogenating agent.

14. In a process for the degradation of the side chain of a steroid, the steps which comprises treating a 3-acetoxy-5-chloro-pregnane-20-one with an acid hydrolysing agent, then with chromium oxide and finally with a dehydrohalogenating agent.

KARL MIESCHER.
HUGO FREY.
CHARLES MEYSTRE.
ALBERT WETTSTEIN.

REFERENCES CITED

The following references are of record in the file of this patent:

UNITED STATES PATENTS

| Number | Name | Date |
|---|---|---|
| 2,153,700 | Serini | Apr. 11, 1939 |
| 2,239,742 | Serini | Apr. 29, 1941 |
| 2,296,284 | Julian | Sept. 22, 1942 |
| 2,312,480 | Reichstein | Mar. 2, 1943 |

FOREIGN PATENTS

| Number | Country | Date |
|---|---|---|
| 544,051 | Great Britain | Mar. 25, 1942 |

Certificate of Correction

Patent No. 2,461,911. February 15, 1949.

KARL MIESCHER ET AL.

It is hereby certified that errors appear in the printed specification of the above numbered patent requiring correction as follows:

In the heading to the printed specification, line 10, after "Serial No. 687,694" insert the period and words . *In Switzerland August 18, 1942*; column 3, line 67, for "insulubility" read *insolubility*; column 7, line 54, Example 2, for "chromatagraphing" read *chromatographing*; column 8, line 73, Example 6, for "$\Delta^{23,23}$" read $\Delta^{20,23}$; column 9, line 27, same example, for "ehtanol" read *ethanol*;

and that the said Letters Patent should be read with these corrections therein that the same may conform to the record of the case in the Patent Office.

Signed and sealed this 30th day of August, A. D. 1949.

[SEAL]

THOMAS F. MURPHY,
*Assistant Commissioner of Patents.*